United States Patent
Takahashi et al.

(10) Patent No.: US 8,094,200 B2
(45) Date of Patent: Jan. 10, 2012

(54) LENS APPARATUS AND IMAGING APPARATUS

(75) Inventors: Yasuhide Takahashi, Saitama (JP); Koji Kawaguchi, Saitama (JP)

(73) Assignee: Tamron Co., Ltd., Saitama-shi (JP)

(*) Notice: Subject to any disclaimer, the term of this patent is extended or adjusted under 35 U.S.C. 154(b) by 465 days.

(21) Appl. No.: 12/337,135

(22) Filed: Dec. 17, 2008

(65) Prior Publication Data

US 2009/0161003 A1  Jun. 25, 2009

(30) Foreign Application Priority Data

Dec. 19, 2007 (JP) ................................. 2007-327900

(51) Int. Cl.
*H04N 5/228* (2006.01)
*H04N 5/225* (2006.01)
*G02B 15/14* (2006.01)

(52) U.S. Cl. ................ 348/208.7; 348/208.11; 348/360; 359/704

(58) Field of Classification Search .................. 248/360, 248/357, E5.024; 348/360, 357, E5.024; 348/208.07–208.11

See application file for complete search history.

(56) References Cited

U.S. PATENT DOCUMENTS

2006/0250702 A1* 11/2006 Nishimoto .................... 359/704

FOREIGN PATENT DOCUMENTS

| CN | 1854786 A | 11/2006 |
|---|---|---|
| JP | 2003-348398 A | 12/2003 |
| JP | 2005-352160 A | 12/2005 |

* cited by examiner

*Primary Examiner* — Tuan Ho
*Assistant Examiner* — Shahbaz Nazrul
(74) *Attorney, Agent, or Firm* — Foley & Lardner LLP (57) ABSTRACT

In a lens apparatus, light entering a lens barrel from an external source is incident to an optoelectric converting element for image recording. The light passing through an optical path of the lens apparatus is filtered by a filter that absorbs a specific range of optical wavelengths and is provided in a filter frame. The filter frame is moved to position the filter at a first position that is on the optical path or at a second position that is away from the optical path. A filter housing structure is provided establishing a frame moving region in which the filter frame is arranged and moves, and blocking the incidence of light from a source other than the optical path to the filter frame moving region.

12 Claims, 6 Drawing Sheets

LENS APPARATUS AND IMAGING APPARATUS

CROSS-REFERENCE TO RELATED APPLICATIONS

The present application is based upon and claims the benefit of priority from prior Japanese Patent Application No. 2007-327900, filed Dec. 19, 2007, the entire contents of which is incorporated herein by reference.

BACKGROUND OF THE INVENTION

1. Field of the Invention

The present invention pertains to a lens apparatus and imaging apparatus applicable in surveillance cameras that record images during the day and at night.

2. Description of the Related Art

Conventionally, imaging apparatuses, such as surveillance cameras that record images during the day and at night, switch between recording images using visible light and infrared light. Among such imaging apparatuses, is an apparatus that includes an infrared (IR) filter that transmits infrared light and a motor that changes the position of the IR filter, and depending on the type of light used for recording an image, the apparatus changes the position of the IR filter to be aligned on the optical path or to be deviated from the optical path.

Another conventional technology, such as that disclosed in Japanese Patent Application Laid-Open Publication No. 2003-348398, includes a switch member that can block or allow infrared light to enter. The switch member is integrated with a diaphragm member that adjusts the amount of light. Furthermore, a conventional technology disclosed in Japanese Patent Application Laid-Open Publication No. 2005-352160 includes a diaphragm unit provided in a lens barrel and enables an optical filter to be inserted into and removed from the lens barrel in proximity to the diaphragm unit.

The insertion and removal of the optical filter is performed by pulling a member provided on a frame holding the optical filter. The optical filter is provided in the lens barrel and this technology further enables the diaphragm unit to be inserted into or removed from the lens barrel in proximity to the optical filter.

However, for the conventional technologies respectively disclosed in Japanese Patent Application Laid-Open Publication Nos. 2003-348398 and 2005-352160, when a device (a lens apparatus, an imaging apparatus employing the lens apparatus) that does not require an IR cut filter is to be manufactured, the lens barrel must be swapped at assembly as the lens barrel is a common part.

Although the only difference between an existing device and a new device is whether an optical filter is provided, the lens barrel including the optical filter must be swapped and as a result, the swap may be performed for a device for which the swap is not necessary, thereby causing unnecessary costs. Additionally, when there are various models of a device, the number of parts used to manufacture each model increases, thereby complicating parts management. The complication of parts management further causes problems in that the cost involved in part swapping and parts management increases.

SUMMARY OF THE INVENTION

It is an object of the present invention to at least solve the above problems in the conventional technologies.

In a lens apparatus, light entering a lens barrel from an external source is incident to an optoelectric converting element for image recording. The lens apparatus includes: a filter frame configured to include a filter that absorbs a specific range of wavelengths of the light passing through an optical path of the lens apparatus; a filter driving unit that moves the filter frame to position the filter at a first position that is on the optical path or at a second position that is away from the optical path; and a filter housing structure that establishes a filter frame moving region in which the filter frame is arranged and moves, and that blocks an incidence of light from a source other than the optical path to the filter frame moving region.

A lens apparatus includes: a lens barrel holding a lens for transmitting light from an external source to an optoelectric converting element for image recording; a filter frame configured to include a filter that absorbs a specific range of wavelengths of the light passing through an optical path; a filter driving unit that moves the filter frame to insert the filter to and remove the filter from the optical path, wherein the filter frame and the filter driving unit are built into the lens barrel.

An imaging apparatus includes: an optoelectric converting element for image recording and that outputs an electrical signal according to an intensity of incident light; and a lens apparatus that transmits light from an external source to the optoelectric converting element, wherein the lens apparatus includes: a filter frame configured to include a filter that absorbs a specific range of wavelengths of the light passing through an optical path of the lens apparatus; a filter driving unit that moves the filter frame to position the filter at a first position that is on the optical path or at a second position that is away from the optical path; and a filter housing structure that establishes a filter frame moving region in which the filter frame is arranged and moves, and that blocks an incidence of light from a source other than the optical path to the filter frame moving region.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Referring to the accompanying drawings, exemplary embodiments according to the present invention are explained in detail below.

Figure 1:
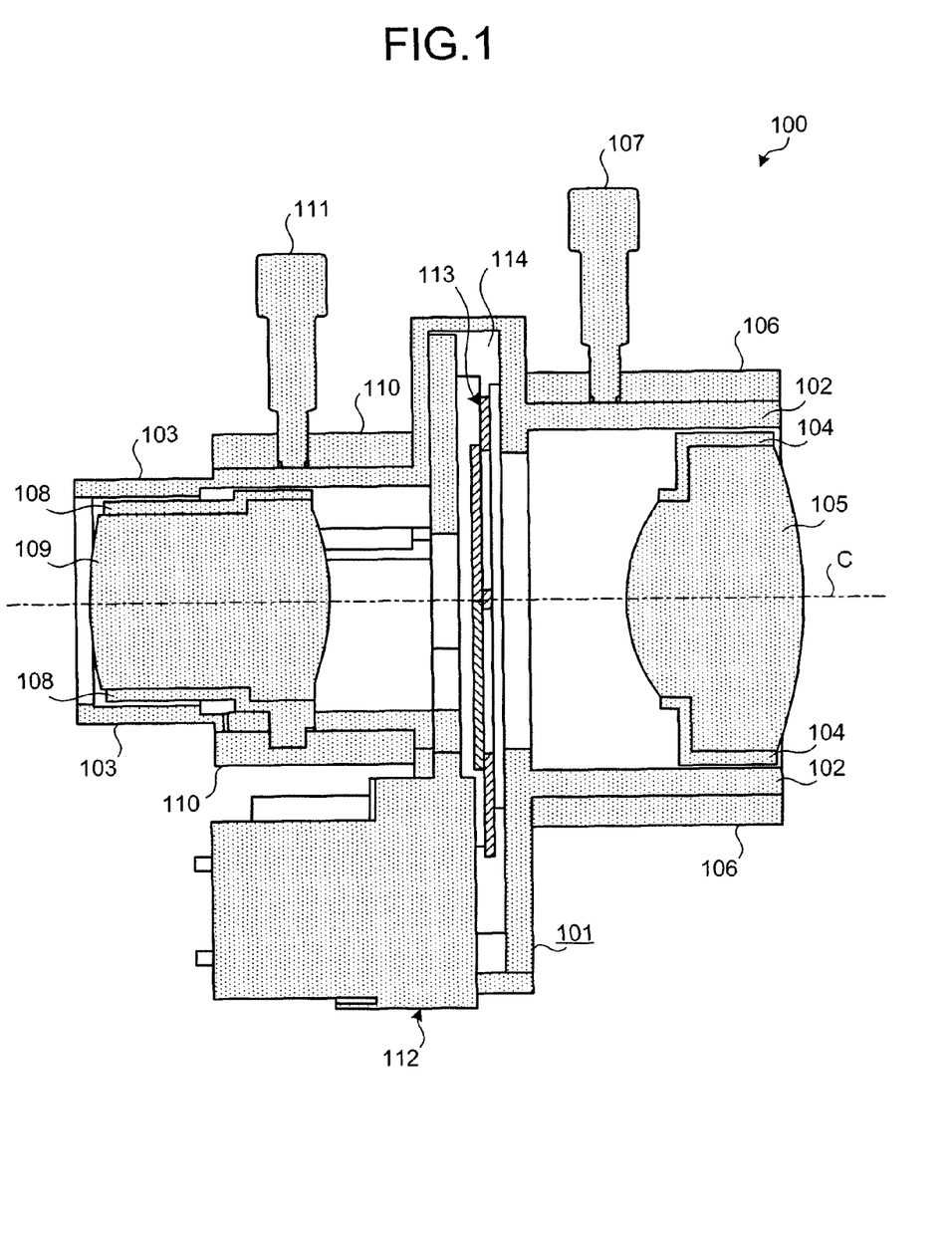
FIG. 1 is a cross sectional view of a lens apparatus according to an embodiment.

FIG. 1 is cross sectional view of a lens apparatus according to an embodiment. As depicted in FIG. 1, a lens apparatus 100 includes a lens barrel 101. The lens barrel 101 has a cylindrical configuration centered about an optical axis C and includes a main lens barrel 102 and a rear lens barrel 103 coupled along the direction of the optical axis C.

The lens barrel 101 is attached to a mount provided in the main body of an imaging apparatus (not depicted). Within the main body of the imaging apparatus, an optoelectric converting element for image recording, i.e., an imaging element, is arranged. The imaging element optoelectrically converts light received through the lens apparatus from an external source and outputs an electrical signal corresponding to the amount of incident light. The imaging element, specifically for example, is implemented by a charge-coupled device (CCD).

The main lens barrel 102 holds a front lens group 105 provided in a front group frame 104. The front group frame 104 is configured to be moveable within the main lens barrel 102 along the optical axis C only. A focusing ring 106 is provided about the outer circumference of the main lens barrel 102 and is rotatable about the optical axis C at the outer circumference of the main lens barrel 102, whereby the front group frame 104, i.e., the front lens group 105, is caused to move along the optical axis C by the rotation of the focusing ring 106.

In the lens apparatus 100, the position of the front lens group 105 is adjusted along the optical axis C through the rotation of the focusing ring 106, thereby enabling focus adjustment of the lens apparatus 100. As configuration causing the front group frame 104 to move along the optical axis C through the rotation of the focusing ring 106 is a commonly known technology, description is omitted herein.

A focus-lock screw 107 that fixes the position of the focusing ring 106 with respect to the main lens barrel 102 is provided at the focusing ring 106. The focus-lock screw 107 in a loosened state allows the focusing ring 106 to be rotated and in a tightened state, fixes the position of the focusing ring 106 with respect to the main lens barrel 102. Thus, after focus adjustment, the position of the front lens group 105 can be fixed.

The rear lens barrel 103 holds a rear lens group 109 provided in a rear group frame 108. The rear group frame 108 is configured to be moveable within the main lens barrel 102 along the optical axis C only. A zoom ring 110 is provided about the outer circumference of the rear lens barrel 103 and is rotatable about the optical axis C at the outer circumference of the rear lens barrel 103, whereby the rear group frame 108, i.e., the rear lens group 109, is caused to move along the optical axis C by the rotation of the zoom ring 110.

In the lens apparatus 100, the position of the rear lens group 109 is adjusted along the optical axis C through the rotation of the zoom ring 110, thereby enabling zoom adjustment of the lens apparatus 100. As configuration causing the rear group frame 108 to move along the optical axis C through the rotation of the zoom ring 110 is a commonly known technology, description is omitted herein.

A zoom-lock screw 111 that fixes the position of the zoom ring 110 with respect to the rear lens barrel 103 is provided at the zoom ring 110. The zoom-lock screw 111 in a loosened state allows the zoom ring 110 to be rotated and in a tightened state, fixes the position of the zoom ring 110 with respect to the rear lens barrel 103. Thus, after zoom adjustment, the position of the rear lens group 109 can be fixed.

Figure 2:
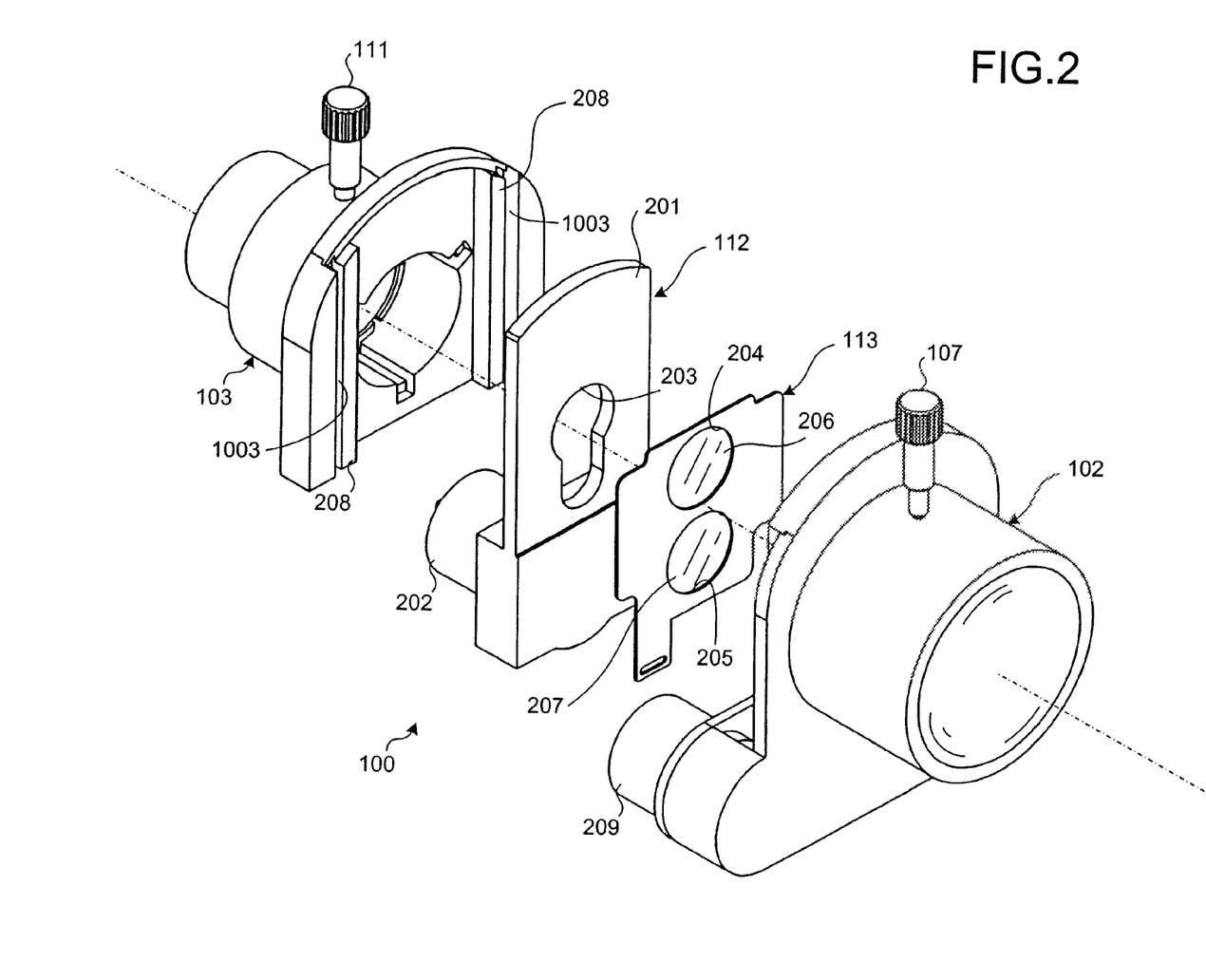
FIG. 2 is an exploded perspective view of the lens apparatus.
Figure 3:
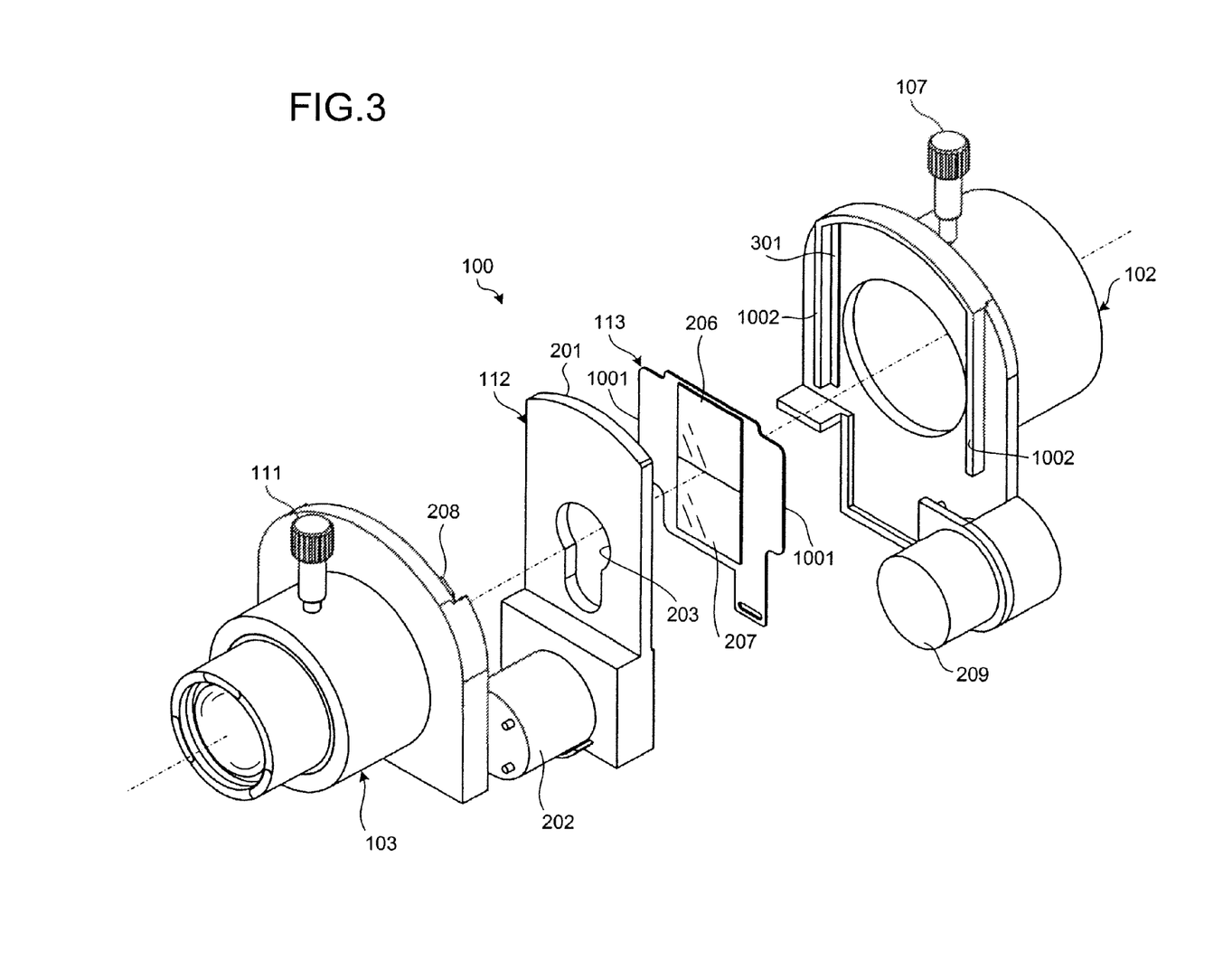
FIG. 3 is another exploded perspective view of the lens apparatus.

An iris unit 112 (as a diaphragm unit) and a filter frame 113 are provided between the main lens barrel 102 and the rear lens barrel 103 (refer to FIGS. 2 and 3). With respect to the rear lens barrel 103, the iris unit 112 is provided in closer proximity than the filter frame 113, and with respect to the main lens barrel 102, the filter frame 113 is provided in closer proximity than the iris unit 112. The filter frame 113 is provided within a filter frame moving region 114 encompassed by the lens barrel 101 and the iris unit 112.

FIGS. 2 and 3 are exploded perspective views of the lens apparatus 100. As depicted in FIGS. 2 and 3, the iris unit 112 includes an aperture forming unit 201 and an iris motor 202. The aperture forming unit 201 includes plural blades (not depicted) that form the aperture. According to the embodiment, the aperture forming unit 201 includes two blades configured to be slidable in opposing directions with respect to one another.

The iris motor 202 generates a driving power to move the blades in opposing directions. According to the amount of light input into the lens barrel, the iris unit 112 operates the iris motor 202 to slide the blades and change the diameter of an aperture 203 at the aperture forming unit 201. The iris unit 112 may be configured to include a plate member having an aperture of a fixed diameter, in place of the plural blades.

The filter frame 113 has a plate-like shape and two through-holes 204, 205 penetrating two opposing surfaces having the greatest areas among the surfaces of the filter frame 113, i.e., penetrating in the direction of thickness. The through-holes 204, 205 are arrayed along the direction in which the blades at the iris unit 112 slide. The filter frame 113 includes an IR cut filter 206 and a dummy filter 207.

The IR cut filter 206 transmits visible light and absorbs infrared light. The dummy filter 207 transmits incident light of all wavelengths. The image location of the light transmitted by the dummy filter 207 and the image location of the IR cut filter 206 coincide. The IR cut filter 206 and the dummy filter 207 are provided covering the through-holes 204 and 205, respectively.

The filter frame 113 is slidable along filter slide rails 301 provided in the rear lens barrel 103. The filter slide rails 301 are oriented along a longitudinal direction of the array of the through-holes 204, 205 in the filter frame 113. The filter frame 113 slides along the filter slide rails 301 when a driving power is generated by an IR motor 209 that serves as a driving unit. A mechanism for sliding the filter frame 113 is explained later.

The main lens barrel 102 includes filter holding rails 208. The filter holding rails 208 are provided at positions opposing the filter slide rails 301 in the direction of the optical axis C. The lens barrel 101 is separated into the main lens barrel 102 and the rear lens barrel 103 in which the filter slide rails 301 and the filter holding rails 208 are provided at opposing aspects of the main lens barrel 102 and the rear lens barrel 103.

When the lens barrel 101 is configured to be an assembly of the main lens barrel 102 and the rear lens barrel 103, the filter slide rails 301 and the filter holding rails 208 oppose each other having the filter frame 113 therebetween. The filter slide rails 301 and the filter holding rails 208 oppose each other by a dimension that is equivalent to or slightly wider than the thickness of the filter frame 113.

In the direction of the optical axis C, i.e., in the direction of the thickness of the filter frame 113, the filter holding rails 208 protrude toward the filter slide rails 301 more than an edge surface of the rear lens barrel 103 opposing the filter slide rails 301. The filter slide rails 301 protrude toward the filter holding rails 208 more than an edge surface of the main lens barrel 102 opposing the filter holding rails 208, in the direction of the optical axis C.

Configuration of the lens apparatus 100 is not limited to both the filter slide rails 301 and the filter holding rails 208 protruding from the main lens barrel 102 and the rear lens barrel 103 toward the filter holding rails 208 and the filter slide rails 301, respectively. Only filter holding rails 208 or only the filter slide rails 301 may protrude toward the main lens barrel 102 or the rear lens barrel 103, in the direction of the optical axis C, i.e., in the direction of the thickness of the filter frame 113.

The filter slide rails 301 and the filter holding rails 208 oppose each other having therebetween a path in which the filter frame 113 moves within a plane orthogonal to the optical axis C. In the embodiment, by the filter slide rails 301 and the filter holding rails 208, a guide member is implemented. The guide member is implemented by a pair of rail members, the filter slide rails 301 and the filter holding rails 208, which oppose each other with a path therebetween, the filter frame 113 moving along the path. The rail members do not have to take a rail-like form that keeps touching the filter frame 113 while the filter frame moves. It suffices that the rail members are disposed at both sides of the path of the filter frame 113 so that the rail members guide the filter frame 113. The filter frame 113 may take a discrete, discontinuous rail-like form so that the rail members intermittently touch the filter frame 113.

The iris unit 112 is provided between the filter holding rails 208 in a plane orthogonal to the optical axis C. In a plane orthogonal to the optical axis C, a space to accommodate the iris unit 112 is formed between the filter holding rails 208. In the embodiment, a diaphragm housing structure is implemented by the space formed to accommodate the iris unit 112 between the filter holding rails 208.

The diaphragm housing structure is not limited to implementation by the space formed between the filter holding rails 208. The diaphragm housing structure can be implemented by a space formed in a plane orthogonal to the optical axis C between the filter slide rails 301 and/or between the filter holding rails 208.

The filter frame 113, between the filter slide rails 301 and the filter holding rails 208, slides along the filter slide rails 301 guided by the filter slide rails 301. In the embodiment, a first support unit is implemented by the filter slide rails 301 and a second support unit is implemented by the filter holding rails 208.

The aperture forming unit 201 is provided between the filter holding rails 208 in a plane orthogonal to the optical axis C. The aperture forming unit 201 is provided between projecting parts of the filter holding rails 208 toward the filter frame 113. The aperture forming unit 201 may be provided between projecting parts of the filter slide rails 301 toward the filter frame 113. Thus, as the position of the aperture forming unit 201 can be fixed in a plane orthogonal to the optical axis C, the position of the iris unit 112 can be determined.

According to such a configuration, the aperture forming unit 201 is provided in a space outside the moving range of the filter frame 113 within the filter frame moving region 114. In this way, the aperture forming unit 201 is provided near the filter frame 113.

The position of the aperture forming unit 201 is determined when the aperture forming unit 201 touches a surface of the filter holding rails 208. The position of the aperture forming unit 201 may be determined when the aperture forming unit 201 touches a surface of the filter slide rails 301.

In the embodiment configuration is such that, in the direction of the optical axis C, an aspect of the filter slide rails 301 or filter holding rails 208 in contact with the filter frame 113 is positioned more on the side where the filter frame 113 is arranged (on the side of the main lens barrel 102) than the iris unit 112. In other words, the IR cut filter 206 and the dummy filter 207 are provided near the iris unit, but are not in contact with the iris unit 112.

Consequently, regardless of the presence of the iris unit 112, the IR cut filter 206 and the dummy filter 207 are independently slidable (motor driven); hence, even if a lens apparatus configured with a fixed diaphragm in place of the iris unit 112 is configured using the same lens barrel 102 as the lens apparatus 100, without interfering with the IR cut filter 206 and the dummy filter 207, the filter frame 113 can be slid.

In this embodiment, the filter slide rails 301 includes projecting units 1002 that supports the filter frame 113 on edge surfaces 1001 from both sides of the path of the filter frame 113 (the IR cut filter 206 and the dummy filter 207). The projecting units 1002 protrudes toward the rear lens barrel 103 more than a surface of the filter slide rails 301 that comes into contact with a surface of the filter frame 113 in the direction of the thickness. The projecting units 1002 comes into contact with both sides of the filter frame 113 disposed within the filter frame moving region 114. In the direction of the optical axis, the rear lens barrel 103 includes housing units 1003 that faces the projecting units 1002 and houses the projecting units 1002 when the main lens barrel 102 and the rear lens barrel 103 are assembled.

In this way, outside the filter frame moving region 114, the projecting units 1002 of the main lens barrel 102 and the housing units 1003 of the rear lens barrel 103 are provided so that unnecessary light coming from sources other than the optical path can be shut out when the main lens barrel 102 and the rear lens barrel 103 are assembled. In addition, the positioning of the main lens barrel 102 and the rear lens barrel 103 is determined in this configuration.

The projecting units 1002 and the housing units 1003 extend in the direction perpendicular to the optical axis and are provided along and near the outer boundary of the filter slide rails 301 and the filter holding rails 208. The projecting units 1002 and the housing units 1003 are on both sides of the path of the filter frame 113 (the IR cut filter 206 and the dummy filter 207) (both sides in the direction of the width of the path). One end of the projecting units 1002 at one side of the path is connected with one end of the projecting units at the other side of the path, the projecting units also extending across the width of the path. One end of the housing units 1003 at one side of the path is connected with one end of the housing units 1003 at the other side of the path, the housing units 1003 also extending across the width of the path.

According to the configuration above, the volume of the filter housing structure (the filter frame moving region 114) is large enough for the filter frame 113 to move. The filter housing structure (the filter frame moving region 114) does not include wasted space and the volume of the filter housing structure can be reduced. As a consequence, the dimension of the lens apparatus 100 is also reduced.

In this embodiment, the filter slide rails 301 include the projecting units 1002 but the filter holding rails 208 may include the projecting units. Either the filter slide rails 301 or the filter holding rails 208 include the projecting units. When the filter holding rails 208 includes the projecting units, the main lens barrel 102 includes the housing units that are to house the projecting units.

In this embodiment, the projecting units 1002 are integrated with the filter slide rails 301 but the projecting units 1002 may be separated from the filter slide rails 301. When the filter holding rails 208 include the projecting units, the projecting units may be separated from the filter holding rails 208.

Figure 4:
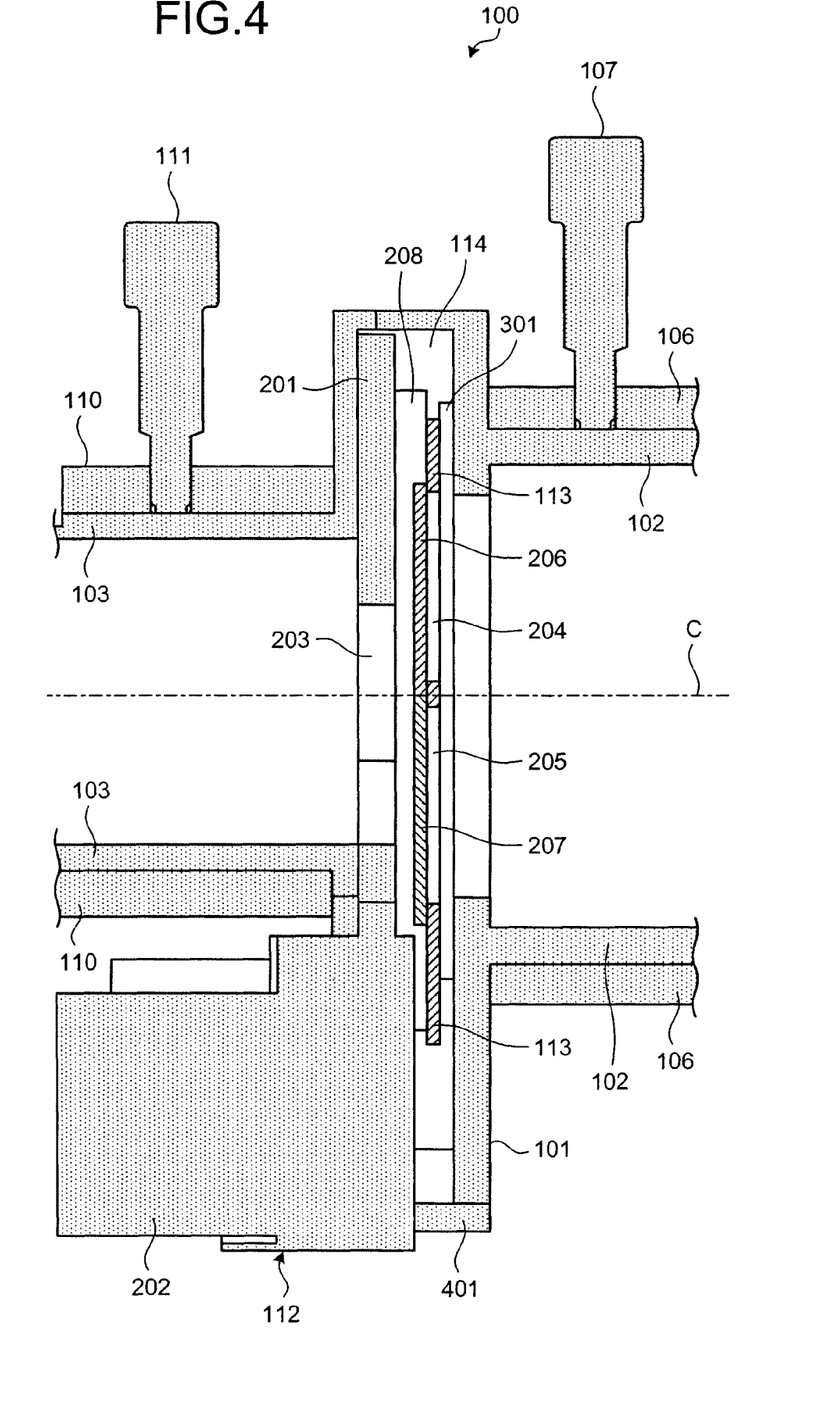
FIG. 4 is an enlarged cross sectional view of the lens apparatus.

FIG. 4 is an enlarged cross sectional view of the lens apparatus. FIG. 4 depicts an enlarged view of a portion of FIG. 1 concerning the filter frame 113. As depicted in FIG. 4, the filter frame moving region 114 is formed by the main lens barrel 102, the iris unit 112, and a cover member 401. In the embodiment, a filter housing structure is realized by the main lens barrel 102, the iris unit 112, and the cover member 401 forming the filter frame moving region 114.

The filter frame moving region 114 is configured such that light in the optical path from the front lens group 105 does not pass outside the lens barrel 101 except from the rear lens group 109 and no external light enters the optical path from a position other than the front lens group 105. The filter frame moving region 114, specifically, is configured such that no light enters or escapes between the main lens barrel 102 and the iris unit 112 or between the main lens barrel 102 and the rear lens barrel 103.

The filter frame moving region 114 encompasses the entire moving region of the filter frame 113, i.e., the filter frame 113 is provided within the filter frame moving region 114. The filter frame 113 is slidable along the filter slide rails 301 within the filter frame moving region 114. Consequently, the filter frame 113 is movable in a direction crossing the optical path.

When the iris unit 112 and the lens barrel 101 are assembled, the iris motor 202 and the IR motor 209 extend in the same direction along the optical axis. The iris motor 202 and the IR motor 209 are disposed at almost the same position.

The iris motor 202 and the IR motor 209 are placed at one side of the lens apparatus. The iris motor 202 and the IR motor 209 are disposed near each other.

The iris motor 202 and the IR motor 209 are placed at the side of the barrel with the smaller lens with respect to the position of the filter housing structure (filter frame moving region 114).

Figure 5:
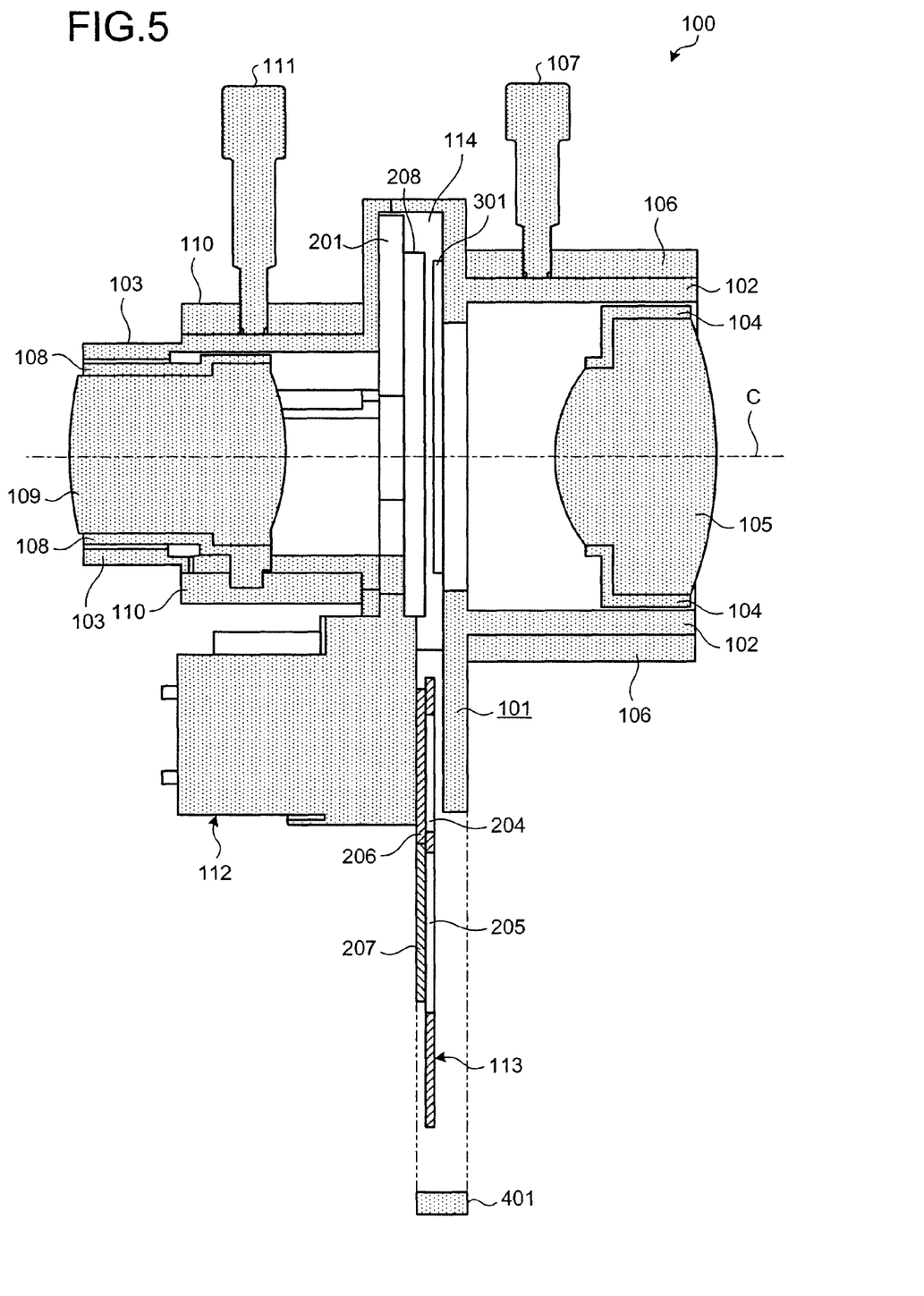
FIG. 5 is a cross section of the lens apparatus.

FIG. 5 is a cross section of the lens apparatus 100. As depicted in FIG. 5, the cover member 401 is removable with respect to the lens barrel 101; FIG. 5 depicts a state in which the cover member 401 is removed. The filter frame moving region 114 is formed when the cover member 401 is attached to the lens barrel 101.

In this embodiment, the main lens barrel 102, the iris unit 112 and the cover member 401 form the filter frame moving region 114 but filter frame moving region 114 is not limited to this embodiment. The filter frame moving region 114 may be covered by a unit other than the cover member 401 at the side where the filter frame 113 or the iris unit 112 is attached or detached.

For example, the iris unit 112 may include a protruding unit (not shown) that protrudes along the optical axis and serves as a cover. When the iris unit 112 is assembled with the filter housing structure, the protruding unit covers the filter frame moving region 114 at the side where the filter frame 113 or the iris unit 112 is attached or detached.

The filter frame 113 is removable from the lens barrel 101 by a sliding of the filter frame 113 along the filter slide rails 301 with the cover member 401 removed. Through the sliding of the filter frame 113 along the filter slide rails 301, the filter frame 113 is movable in a direction crossing the optical path.

In the lens apparatus 100, as described above, with the filter frame 113 in a removed state, the cover member 401 is attached to the lens barrel 101 to form the filter frame moving region 114, thereby enabling a different lens apparatus that does not require the IR cut filter 206 to be configured using the lens barrel 101 as a common part. In other words, the removability of the filter frame 113 enables the manufacture of a lens apparatus for a particular intended use or a variety of different lens apparatuses.

Additionally, in the lens apparatus 100, after the cover member 401 is removed from the lens barrel 101, the filter frame 113 can be exchanged with another filter frame by inserting the filter frame into the filter frame moving region 114 along the filter slide rails 301. Thus, for example, by replacing the filter frame 113 with a filter that absorbs/transmits a different optical wavelength, a special-use or a variety of different lens apparatuses can be manufactured using the lens barrel as a common part. In other words, by exchanging the filter frame 113, a special-use or a variety of different lens apparatuses can be manufactured.

Further, with the lens apparatus 100, parts management can be performed based on the smallest component unit, e.g., the filter frame 113, rather than based on a filter unit including the IR cut filter 206, the dummy filter 207, and the IR motor 209 driving the IR cut filter 206 and the dummy filter 207. Thus, common parts can be employed for the manufacture of various models of the lens apparatus 100, the models differing by the inclusion (non-inclusion) of the filter frame 113 or the IR cut filter 206. Hence, even when a large number of models are manufactured, the cost involved in manufacturing and management can be reduced, thereby enabling reduction of the manufacturing cost of the lens apparatus 100.

Figure 6:
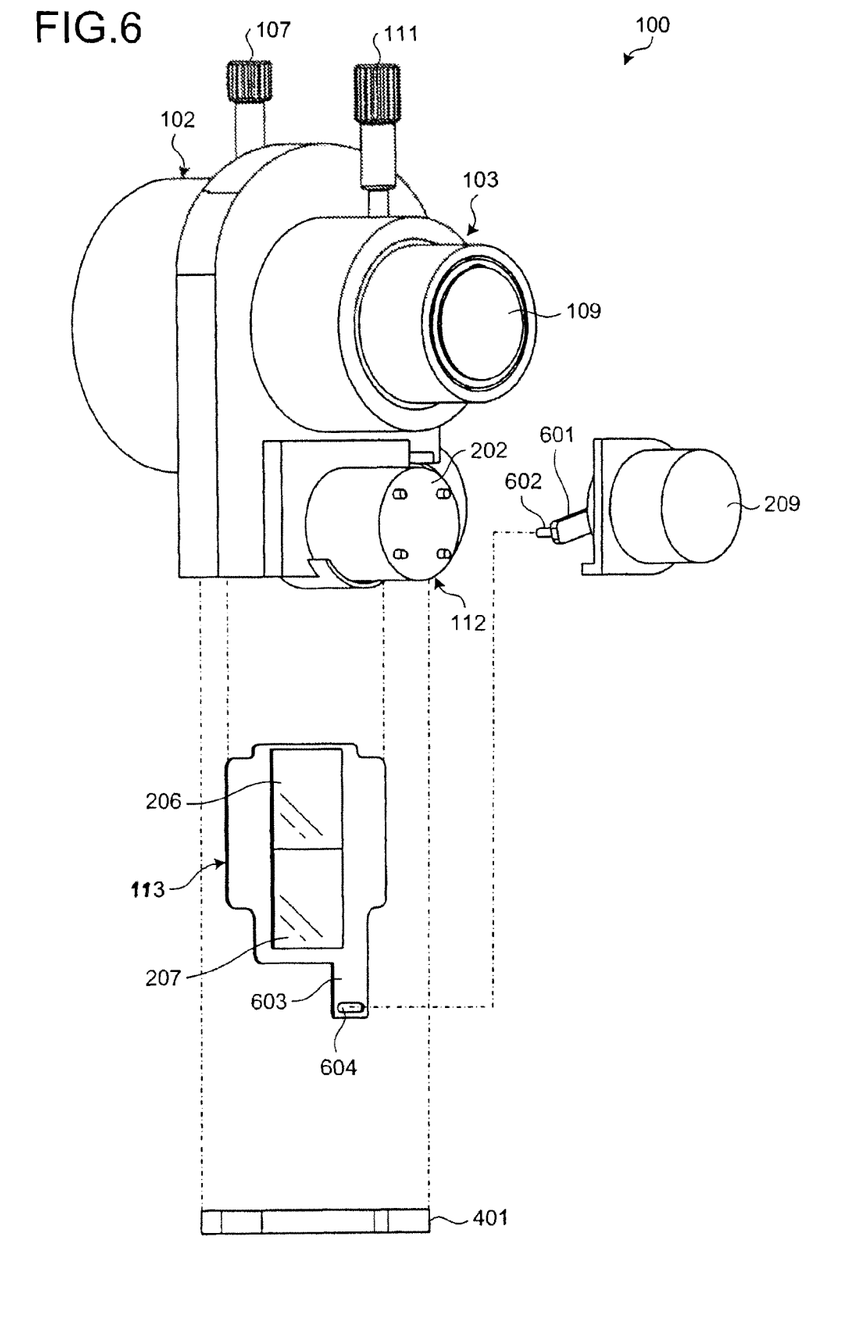
FIG. 6 is another exploded perspective of the lens apparatus.

FIG. 6 is an exploded perspective of the lens apparatus 100. FIG. 6 depicts a state in which the cover member 401 is removed from the lens apparatus 100 and the filter frame 113 is removed. As depicted in FIG. 6, when the filter frame 113 is to be removed, the IR motor 209 is removed first.

The IR motor 209 includes an arm 601 and an engagement pin 602. The arm 601 is coupled with drive shaft (not depicted) of the IR motor 209 and has a rod-shape whose longitudinal dimension is along a direction of the radius of the drive shaft. The arm 601 is coupled to enable rotation about the drive shaft. The engagement pin 602 is provided at an end of the arm 601 opposite from an end at the drive shaft and protrudes toward the lens barrel 101 along the axial direction of the drive shaft.

The filter frame 113 includes a protrusion 603. The protrusion 603 protrudes from the IR cut filter 206 and the dummy filter 207 toward the cover member 401. The protrusion 603 includes a slit 604 into which the engagement pin 602 is inserted.

When the filter frame 113 and the IR motor 209 are attached to the lens barrel 101, the engagement pin 602 is engaged in a slidable state within the slit 604. With the engagement pin 602 and the slit 604 engaged, when the IR motor is operated, the arm 601 rotates causing the engagement pin 602 to slide within the slit 604 and be displaced.

The filter frame 113 slides along the filter slide rails 301 linked with the displacement of the engagement pin 602, and the IR cut filter 206 is positioned at a first position on the optical path or the dummy filter 207 is positioned at a second position on the optical path. Here, a filter drive unit is implemented by the IR motor 209, the arm 601, the engagement pin 602, the protrusion 603, and the slit 604.

According to the configuration above, when an image is recorded using infrared light, such as at night, the lens apparatus 100 drives the filter frame 113 using the IR motor 209 to slide the filter frame 113 such that the dummy filter 207 is positioned on the optical path. Thus, the entire range of wavelengths therein incident to the lens apparatus 100 are incident to the rear lens group, thereby enabling image recording using infrared light.

Additionally, for image recording using visible light, the filter frame 113 is driven using the IR motor 209 to slide the filter frame 113 such that the IR cut filter 206 is positioned on the optical path. Thus, only visible light is incident to the rear lens group, thereby enabling image recording using visible light.

As described above, according to the embodiment, by forming a filter housing structure by the main lens barrel 102, the iris unit 112, and the cover member 401, when the filter frame 113 is attached to or detached from the lens barrel 101, a moving region for the filter frame 113 can be established and the incidence of light from a source other than the optical path to the filter frame moving region 114 can be blocked. Thus, common parts can be employed for the manufacture of various models of the lens apparatus 100, the models differing by the inclusion (non-inclusion) of the filter frame 113 or the IR cut filter 206.

Consequently, when various models of the lens apparatus, the intended-use of each differing, are to be manufactured, the number of parts that need to be manufactured and managed can be reduced. A reduction in the number of parts enables reductions in the costs involved in the manufacture and management of the parts, thereby facilitating reductions in the manufacturing cost of the lens apparatus 100.

Further, according to the embodiment, with the configuration of the lens barrel 101 (the main lens barrel 102) supporting the filter frame 113 through the provision of the filter slide rails 301 in the lens barrel 101 (main lens barrel 102), a dimension of the lens apparatus 100 along the direction of the optical axis C can be reduced compared with implementation using a different member, thereby enabling a size reduction of the lens apparatus 100.

When the dimension of the lens apparatus in the direction of the optical axis C is to be equivalent to an existing apparatus, compared with implementation using a different member, the difference in length saved by the configuration of the lens barrel 101 (the main lens barrel 102) supporting the filter frame 113 to be slidable can be used in establishing the movable range of the front lens group 105 or the rear lens group 109. Consequently, tolerance of the optical design can be improved, thereby contributing to improved optical performance of the lens apparatus 100.

According to the embodiment, the cover member 401 can be removed from the lens barrel 101 and the iris unit 112, and by a sliding of the filter frame 113 along the filter slide rails 301, the filter frame 113 can be removed. Consequently, as the filter frame 113 can be removed after assembly of the lens apparatus 100, maintenance with respect to the filter and/or the filter frame 113 can be performed easily.

Through the configuration holding the filter frame 113 at the coupling of the main lens barrel 102 and the rear lens barrel 103 forming the lens barrel 101, the filter frame moving region 114 can be formed by the assembly of the lens barrel 101. As a result, the ease of handling and assembly work can be improved.

As the filter frame 113 is provided in proximity to the iris unit 112 according to the embodiment, without large optical design modifications of conventional lens apparatuses integrating an iris unit and an IR cut filter in the same unit, optical sealing of the optical path can be achieved even when the filter frame is removed. As a result, the configuration of the lens apparatus 100 according to the embodiment can be implemented using existing parts and without excessive cost, and the lens apparatus 100 according to the embodiment can be manufactured.

Through the adoption of the lens apparatus 100 having relatively fewer parts and a reduced manufacturing cost into an imaging apparatus, the imaging apparatus can be manufactured at a lower cost without sacrificing imaging performance.

Although in the embodiment, the filter frame 113 holding the IR cut filter 206 and the dummy filter 207 has been described, configuration is not limited hereto. For example, a filter frame may be formed by an optical filter (IR cut filter 206, etc.) itself and in a portion of the optical filter, an opening may be provided, the dummy filter 207 being provided at the opening. Further, the filter frame may be formed by the material (glass, etc.) forming the dummy filter and in a portion of the material, an opening may be provided, the IR cut filter being provided at the opening.

According to the embodiment, the lens apparatus 100 is described to include a lens barrel 101 formed by a main lens barrel 102 and a rear lens barrel 103 coupled along the optical axis C; however, configuration of the lens barrel 101 is not limited hereto. The lens barrel may be formed by a single part. Even when a lens barrel formed by a single part is used in place of the lens barrel 101, each of the effects described above can still be obtained.

As described above, according to the embodiment, even for the manufacture of various models (the intended-use of each differing) of the lens apparatus 100, common parts can be employed and the number of parts that must be managed can be reduced. As a result, the cost involved in the manufacture and management of parts, and consequently in the manufacturing cost of the lens apparatus 100 can be reduced.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A lens apparatus in which light entering a lens barrel from an external source is incident to an optoelectric converting element for image recording, the lens apparatus comprising:
   a filter frame configured to include a filter that absorbs a specific range of wavelengths of light passing through an optical path of the lens apparatus;
   a filter driving unit that moves the filter frame to position the filter at a first position that is on the optical path or at a second position that is away from the optical path; and
   a filter housing structure that establishes a filter frame moving region in which the filter frame is arranged and moves, and that blocks an incidence of light from a source other than the optical path to the filter frame moving region, wherein the lens barrel includes a plurality of lenses, and the filter housing structure is arranged between the lenses,
   wherein the filter housing structure includes:
      a first support unit that is provided in the lens barrel and supports the filter frame to be moveable, enabling insertion and removal of the filter with respect to the optical path, and
      a second support unit that is provided in the lens barrel, forms a space with the first support unit, and supports the filter frame to be moveable in the space, enabling insertion and removal of the filter with respect to the optical path.

2. The lens apparatus according to claim 1, wherein the filter housing structure supports the filter, enabling insertion and removal of the filter with respect to the lens barrel.

3. The lens apparatus according to claim 1, wherein:
   the lens barrel is separated, across an optical axis, at a position where the filter frame is attached, and
   the filter housing structure, when separate lens barrels forming the lens barrel are assembled, forms the filter frame moving region between the separate lens barrels and supports the filter frame to be moveable.

4. The lens apparatus according to claim 1, further comprising a diaphragm unit that is provided near the filter frame and adjusts an amount of the light passing through the optical path.

5. The lens apparatus according to claim 4, wherein the diaphragm unit is held in the filter housing structure.

6. The lens apparatus according to claim 1 further comprising:
   a diaphragm unit that is provided near the filter frame and adjusts an amount of the light passing through the optical path; wherein:
   at least one among the first support unit and the second support unit includes, in a plane orthogonal to an optical axis, guide members disposed at both sides of a path along which the filter inserted to and removed from the optical path moves, and
   the diaphragm unit is provided in a space between the guide members.

7. The lens apparatus according to claim 6, wherein:
the guide members protrude toward the filter frame more than a surface of the diaphragm unit that faces the filter frame, and
the space is created by the protruding guide members.

8. A lens apparatus in which light entering a lens barrel from an external source is incident to an optoelectric converting element for image recording, the lens apparatus comprising:
a filter frame configured to include a filter that absorbs a specific range of wavelengths of light passing through an optical path;
a filter driving unit that moves the filter frame to position the filter at a first position that is on the optical path or at a second position that is away from the optical path,
a filter housing structure that establishes a filter frame moving region in which the filter frame is arranged and moves, and that blocks an incidence of light from a source other than the optical path to the filter frame moving region, wherein:
the lens barrel includes a plurality of lenses, and
the filter housing structure is arranged between the lenses.

9. An imaging apparatus comprising:
an optoelectric converting element for image recording and that outputs an electrical signal according to an intensity of incident light; and
a lens apparatus that transmits light from an external source to the optoelectric converting element, wherein:
the lens apparatus includes:
a filter frame configured to include a filter that absorbs a specific range of wavelengths of the light passing through an optical path of the lens apparatus,
a filter driving unit that moves the filter frame to position the filter at a first position that is on the optical path or at a second position that is away from the optical path, and
a filter housing structure that establishes a filter frame moving region in which the filter frame is arranged and moves, and that blocks an incidence of light from a source other than the optical path to the filter frame moving region,
wherein the filter housing structure includes:
a first support unit that is provided in a lens barrel and supports the filter frame to be moveable, enabling insertion and removal of the filter with respect to the optical path, and
a second support unit that is provided in the lens barrel, forms a space with the first support unit, and supports the filter frame to be moveable in the space, enabling insertion and removal of the filter with respect to the optical path wherein the lens barrel includes a plurality of lenses, and the filter housing structure is arranged between the lenses.

10. The lens apparatus according to claim 6, wherein the guide members are rail members.

11. The lens apparatus according to claim 6, wherein the guide members comprise a pair of guide members which oppose each other with a path therebetween for the filter frame.

12. The lens apparatus according to claim 6, wherein the guide members include projecting units which support the filter frame on edge surfaces of the filter frame, wherein the edge surfaces of the filter frame are substantially parallel to the optical axis.

* * * * *